(12) United States Patent
Gestner

(10) Patent No.: US 10,309,813 B2
(45) Date of Patent: Jun. 4, 2019

(54) METHOD AND SYSTEM FOR FLUID FLOW RATE MEASUREMENT

(71) Applicant: Soneter, Inc., Atlanta, GA (US)

(72) Inventor: Brian Gestner, Atlanta, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 686 days.

(21) Appl. No.: 14/741,124

(22) Filed: Jun. 16, 2015

(65) Prior Publication Data

US 2016/0334255 A1    Nov. 17, 2016

Related U.S. Application Data

(60) Provisional application No. 62/162,568, filed on May 15, 2015.

(51) Int. Cl.
  *G01M 3/28*    (2006.01)
  *G01F 1/66*    (2006.01)
  *F17D 1/00*    (2006.01)

(52) U.S. Cl.
  CPC .............. *G01F 1/667* (2013.01); *G01F 1/66* (2013.01); *F17D 1/00* (2013.01); *G01M 3/28* (2013.01)

(58) Field of Classification Search
  CPC ............ G01F 1/66; G01F 1/662; G01M 3/28
  See application file for complete search history.

(56) References Cited

U.S. PATENT DOCUMENTS

| | | |
|---|---|---|
| 4,633,719 A | 1/1987 | Vander Heyden |
| 5,544,203 A | 8/1996 | Casasanta et al. |
| 5,753,824 A | 5/1998 | Fletcher-Haynes |
| 6,593,871 B1 | 7/2003 | Miethig et al. |
| 6,654,697 B1 | 11/2003 | Eryurek et al. |
| 8,489,342 B2 | 7/2013 | Dugger et al. |

(Continued)

FOREIGN PATENT DOCUMENTS

EP    2 383 550 A1    11/2011

OTHER PUBLICATIONS

International Search Report & Written Opinion on PCT/US2016/032401 dated Aug. 25, 2016.

(Continued)

*Primary Examiner* — Sujoy K Kundu
*Assistant Examiner* — L. Anderson
(74) *Attorney, Agent, or Firm* — Foley & Lardner LLP

(57) ABSTRACT

A fluid flow meter system for monitoring fluid flow through a lumen includes a first ultrasonic transducer configured to transmit one or more versions of a transmit (TX) signal through a fluid flowing within the lumen, and a second ultrasonic transducer configured to receive one or more respective receive (RX) signals. The fluid flow meter system includes an analog-to-digital converter (ADC) configured to sample, at a first frequency, the one or more RX ultrasonic signals and a processor configured to generate a fine resolution signal based on the one or more RX ultrasonic signals. The fine resolution signal is associated with a second sampling rate higher than the first sampling rate. The processor is also configured to compute a cross-correlation signal indicative of cross-correlation between the fine resolution signal and a waveform and determine an estimated fluid flow parameter based on the computed cross-correlation signal.

20 Claims, 13 Drawing Sheets

(56) References Cited

U.S. PATENT DOCUMENTS

| | | | |
|---|---|---|---|
| 9,410,833 | B1 | 8/2016 | Leaders et al. |
| 9,874,466 | B2 | 1/2018 | Leaders et al. |
| 2005/0288873 | A1 | 12/2005 | Urdaneta et al. |
| 2009/0256640 | A1 | 10/2009 | Reilly et al. |
| 2012/0055239 | A1 | 3/2012 | Sinha |
| 2013/0080081 | A1* | 3/2013 | Dugger ............... G01F 1/667 702/48 |
| 2014/0208867 | A1 | 7/2014 | Byrd et al. |
| 2015/0330818 | A1* | 11/2015 | Leaders ............... G01F 1/667 73/861.28 |

OTHER PUBLICATIONS

Afaneh, A.; He Yin; Kalashnikov, A.N., "Implementation of accurate frame interleaved sampling in a low cost FPGA-based data acquisition system," IEEE 6th International Conference on Intelligent Data Acquisition and Advanced Computing Systems (IDAACS), vol. 1, pp. 20-25, Sep. 15-17, 2011.

Supplementary European Search Report for EP Application No. 16797015.1 dated Apr. 24, 2018.

Wen Ma et al: "Accurate time delay estimation based on sine filtering" Signal Processing, 2002 6th International Conference on Aug. 26-30, 2002,Piscataway, NJ, USA,IEEE, vol. 2, Aug. 26, 2002 (Aug. 26, 2002), pp. 1621-1624, XP010627850, ISBN: 978-0-7803-7488-1.

International Preliminary Report on Patentability for PCT/US2016/032401 dated Nov. 21, 2017.

U.S. Office Action on U.S. Appl. No. 15/527,691 dated Apr. 3, 2018.

Examination Report for AU Application No. 2017235994 dated Jul. 10, 2018.

Final Office Action on U.S. Appl. No. 15/527,691 dated Sep. 12, 2018.

Notice of Grant for AU 2016263122 dated Oct. 12, 2017.

Notice of Allowance for CA 2,968,991 dated Feb. 5, 2018.

* cited by examiner

METHOD AND SYSTEM FOR FLUID FLOW RATE MEASUREMENT

RELATED APPLICATION

This application claims priority to, and the benefit of, U.S. Provisional Application No. 62/162,568, entitled "METHOD AND SYSTEM FOR FLUID FLOW RATE MEASUREMENT" and filed on May 15, 2015, which is incorporated herein by reference in its entirety.

BACKGROUND

Monitoring fluid flow rate in fluid distribution system can allow for pump efficiency (such as in systems employing pumps), leak detection or remote monitoring of fluid distribution systems. In water distribution systems, monitoring water flow rate can help monitoring water usage and detecting water leaks. When water leaks are detected at an early stage, substantial damage to buildings can be avoided. In natural gas distribution system, reliable leak detection can help avoid dangerous fires and/or explosions.

SUMMARY

According to at least one aspect, a fluid flow meter system for monitoring fluid flow through a lumen includes an ultrasonic sensor. The ultrasonic sensor can include a first ultrasonic transducer configured to transmit one or more versions of a transmit (TX) ultrasonic signal through a fluid flowing within the lumen, and a second ultrasonic transducer configured to receive one or more receive (RX) ultrasonic signals corresponding to the one or more transmitted versions of the TX ultrasonic signal. The fluid flow meter system includes an analog-to-digital converter (ADC) configured to sample, at a first frequency, the one or more RX ultrasonic signals received by the second transducer. The fluid flow meter system also includes a processor configured to generate a fine resolution signal based on the one or more RX ultrasonic signals. The fine resolution signal is associated with a second sampling rate higher than the first sampling rate. The processor is also configured to compute a cross-correlation signal indicative of cross-correlation between the fine resolution signal and a waveform and determine an estimated fluid flow rate (or fluid flow velocity) of the fluid based on the computed cross-correlation signal.

DETAILED DESCRIPTION

Systems and devices described in the current disclosure allow for accurate and cost effective estimation of flow rate (or flow velocity/speed) for a fluid flowing through a lumen such as a pipe. In particular, an ultrasonic fluid flow meter can include ultrasonic transducers capable of transmitting/receiving ultrasonic signals to propagate through the fluid flowing in the lumen. The ultrasonic flow meter can estimate the fluid flow rate (or fluid flow velocity) based on measured or estimated propagation characteristics of the ultrasonic signal within the fluid. The ultrasonic signal propagation speed (or propagation time) can vary depending on the type of fluid, fluid flow direction and speed with respect to signal propagation direction, fluid temperature, or other fluid parameters that can affect fluid density or fluid compressibility.

An ultrasonic signal propagating in the same direction as a fluid flow (i.e., downstream) propagates faster than another ultrasonic signal propagating opposite to fluid flow direction (i.e. upstream) or faster than an ultrasonic signal propagating in non-moving fluid. Fluid flow speed (or fluid flow rate) can be estimated based on difference(s) in ultrasonic signal propagation time (or difference in ultrasonic signal propagation speed) between signals propagating differently with respect to fluid flow. For instance, the difference in ultrasonic signal propagation speed in water between an upstream propagating signal and a downstream propagating signal is linearly proportional to the water flow rate at least for a practical range of water flow rates.

Fluid flow speed (or fluid flow rate) can be estimated based on relative time delays associated with signals propagating differently (e.g., upstream and downstream signal) with respect to fluid flow in the lumen. Such relative time delays can be, in some cases, in the range of nano-seconds (ns). In order to accurately measure (or estimate) the relative time delays between ultrasonic signals, a flow meter can employ multiple analog-to-digital converters (ADCs) with respective ADC clocks running at relative time delays with respect to each other. The flow meter can interleave samples provided by separate ADCs achieve an effective sampling rate for measured ultrasonic signals high enough to allow measuring relatively small time delays (such as in the range of nano-seconds). Using multiple ADCs increases the cost of the flow meter and poses technical challenges such as power efficiency and addressing mismatch in voltage offset between different ADCs. A flow meter also can employ a single high speed ADC to improve signal resolution. However, high speed ADCs are more expensive and consume significantly more power than ADCs with lower sampling rates. Also, employing a high speed ADC may not be enough to reach a given desired signal resolution.

Figure 1:
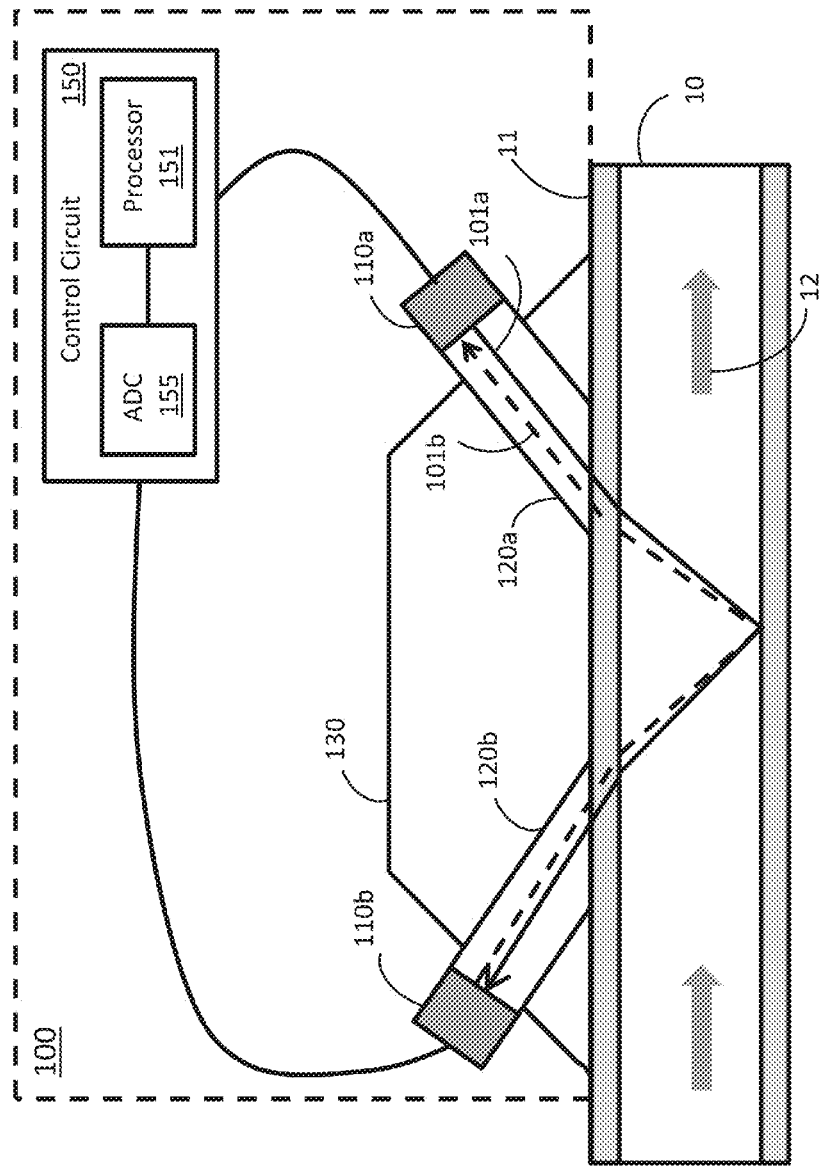
FIG. 1 shows a diagram illustrating a flow meter system mounted on a pipe.

FIG. 1 shows a diagram illustrating a flow meter system 100 mounted on a pipe 10. The flow rate meter system 100 includes two ultrasonic transducers 110a and 110b (also referred to either individually or collectively as transducer(s) 110), two waveguide 120a and 120b (also referred to either individually or collectively as waveguide(s) 120), a control circuit 150 coupled to the ultrasonic transducers 110 and a transducer block 130 for fixing the ultrasonic transducers 110 to the pipe 10. The control circuit 150 can include a processor 151 and an analog-to-digital converter (ADC) 155.

As shown in FIG. 1, the ultrasonic transducers 110 can be mounted in a non-invasive manner. That is, the ultrasonic transducers 110 or the waveguides 120 do not interfere with the fluid flow path within the pipe 10. In some implementations, the transducers 110 can be placed within openings of the pipe wall 11 in an invasive manner. In some implementations, the waveguides 120 can be optional. In such implementations, the transducers 110 can be mounted directly to the pipe 10 without waveguides 120.

Each of the ultrasonic transducers 110 can be capable of transmitting and receiving ultrasonic signals. For instance, the ultrasonic transducer 110a transmits the ultrasonic signal 101a, which propagates through the waveguide 120a into the pipe 10, reflects back from the pipe wall 11 towards the waveguide 120b and is received at the ultrasonic transducer 110b. The ultrasonic transducer 110b transmits the ultrasonic signal 101b, which propagates through the waveguide 120b into the pipe 10, reflects back from the pipe wall 11 towards the waveguide 120a and is received at the ultrasonic transducer 110a. In the pipe 10, fluid is flowing according to direction 12. As such, the ultrasonic signal 101a propagates upstream (i.e., having a motion component along the axis of the pipe 10 with a direction opposite to the fluid flow direction 12 while bouncing) within the pipe 10 and the ultrasonic signal 101b propagates downstream (i.e., having a motion component along the axis of the pipe 10 with a direction similar to the fluid flow direction 12). Given the propagation direction of the ultrasonic signals 101a and 101b with respect to the fluid flow direction 12, the respective propagation times are affected differently by the fluid flow. For instance, the propagation time of the downstream ultrasonic signal 101b is expected to be shorter than that of the downstream ultrasonic signal 101a. Ultrasonic signals propagating through the fluid are also referred to herein as ultrasonic signal(s) 101. In some implementations, the ultrasonic transducers 110 can transmit signals in one direction (e.g., downstream or upstream). In such implementations, signal propagation time can be compared to propagation time associated with a signal propagating in non-moving fluid to determine the effect of fluid flow on signal propagation through the fluid.

In some implementations, the flow meter system 100 can include more than two ultrasonic transducers 110. In some implementations, each ultrasonic transducer 110 in the flow meter system 100 can be capable of acting as a transmitter and a receiver. In some implementations, some ultrasonic transducers 110 in the flow meter system 100 can be configured (or designated) to act as transmitters while others can be configured (or designated) to act as receivers. While the system 100 employs the ultrasonic transducers 110 to transmit or receive signals, other types of signal transmitters/receivers such as acoustic or electromagnetic transmitters/receivers can be employed.

The ADC 155 can be configured to sample receive (RX) ultrasonic signals received at the ultrasonic transducers 110. In some implementations, the flow meter system 100 includes a single ADC converter 155. In some implementations, the sampling rate of the ADC 155 can be smaller than a sampling rate associated with a desired signal resolution (or desired sampling rate) for achieving accurate estimation of fluid flow rate, fluid flow speed or relative time delays associated with received (RX) ultrasonic signals. For instance, the sampling period of the ADC 155 can be in the range of micro-seconds ($\mu s$) while a desired resolution of relative time delays between ultrasonic signals 101 propagating within the fluid can be in the range of nano-seconds (ns). The ADC 155 can be coupled to the processor 151 or a memory associated with the control circuit 150. For instance, the ADC 155 can be configured to provide signal samples directly to the processor 151 or store the samples in a memory accessible by the processor 151. The control circuit 150 can further include a digital-to-analog converter (DAC) configured to convert waveform samples into analog signals. For instance, the DAC can convert samples of a digital excitation signal into a respective analog excitation signal that is provided as input to the ultrasonic transducer(s) 110. The processor 151 or a memory associated with the control circuit 150 can store the samples of the digital excitation signal. In some implementations, the ADC 151 can be capable of operating as an ADC and a DAC. In some implementations, the digital excitation signal can include a pseudo random noise, a pulse train with a given frequency, pure tone at a given frequency, liner or logarithmic chirp signal or frequency modulated pulse train (e.g., with increasing or decreasing frequency). In response to the input analog excitation signal, the transducer 110 can output a band-pass signal that is transmitted into the pipe 10.

The processor 151 can be configured to control the operation and timing of the ultrasonic transducers 110 (e.g., initiate transmission/reception of ultrasonic signals 101), control the operation of the ADC 155 (e.g., initiate signal sampling by the ADC 155), control the operation of one or more other components of the control circuit 150, initiate and mange communication with other devices, execute processes for estimating relative time delays between distinct signals or fluid flow rate, managing power consumption of the flow meter system 100 or a combination thereof. The processor 151 can include one or more of a microprocessor, microcontroller, digital signal processor (DSP), and application-specific integrated circuit (ASIC). The control circuit 150 can also include communication circuit(s) or component(s) for communicating with other devices, one or more signal amplifiers, or other analog or digital circuitry.

Figure 2:
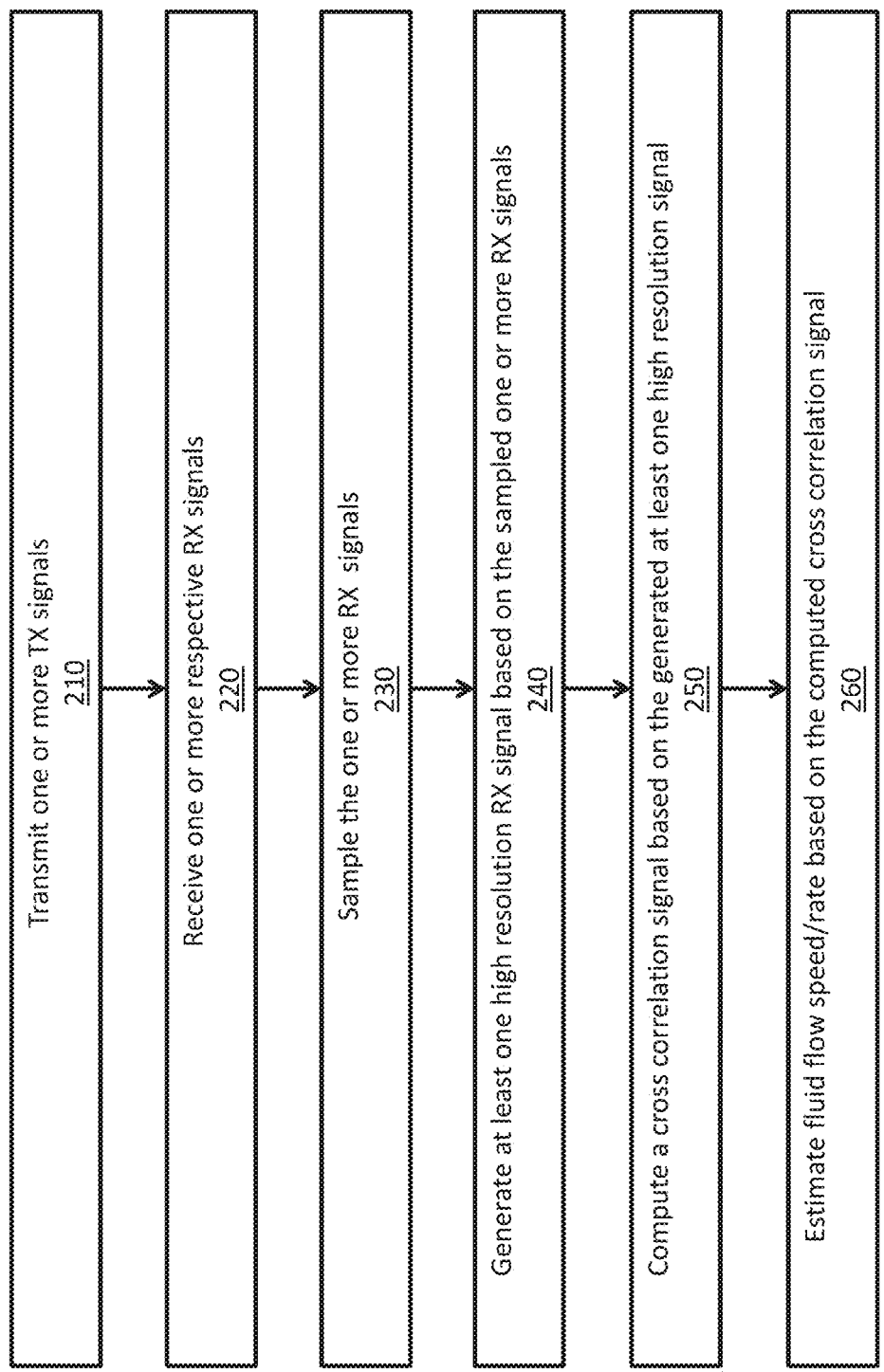
FIG. 2 is a flow diagram illustrating a method for estimating fluid flow rate or fluid flow velocity.

FIG. 2 is a flow diagram illustrating a method 200 for estimating fluid flow rate or fluid flow velocity. Referring to FIGS. 1 and 2, the method 200 can include the ultrasonic transducers 110 transmitting one or more TX signals (stage 210) and receiving one or more respective RX signals (stage 220). The method 200 can include the ADC 155 sampling the one or more RX signals according to a first sampling rate (stage 230). The method 200 can include the processor 151 generating at least one high resolution RX signal based on samples of the one or more RX signals provided by the ADC 155 (stage 240). The high resolution RX signal(s) corresponds to a second sampling rate higher than the first sampling rate. The method 200 can also include the processor 151 computing a cross-correlation signal between the high resolution RX signal and a waveform (stage 250) and estimating fluid flow rate (or fluid flow speed) based on the computed cross-correlation signal (stage 256).

The method 200 can include the transducers 110 transmitting one or more TX signals (stage 210) and receiving one or more respective RX signals (stage 220). In some implementations, the ultrasonic transducers 110 can transmit (such as responsive to instruction(s) from the processor 151) one or more downstream signals, one or more upstream signals or a combination thereof. In some implementations, the ultrasonic transducers 110 can be configured to transmit a plurality of copies or versions of a TX signal and receive a plurality of respective RX signals over a given time period. The given time period can be in the range of hundreds of micro seconds (μs), milli-seconds (ms) or any other time period during which channel characteristics are not expected to vary. The media through which the ultrasonic signals propagate from one transducer to another can be viewed as a communication channel whose characteristics may vary, for instance, due to temperature variation of the media. The redundancy associated with the plurality of received RX signals corresponding to the plurality of transmitted copies or versions of the TX signal allows for noise reduction, for instance, by using averaging methods when estimating relative signal delays (or signal arrival times). In some implementations, the ultrasonic transducers 110 can be configured to transmit a plurality of copies of the TX signal that are synchronized with respect to the ADC clock signal. That is, all the copies can have the same fractional (or differential) time delay (i.e., amount of delay modulo the ADC sampling period T) with respect to the ADC clock signal. In some implementations, the ultrasonic transducers 110 can be configured to transmit a plurality of versions of the TX signal having distinct fractional (or differential) time delays (i.e., amount of delay modulo the ADC sampling period T) with respect the ADC clock signal. In some implementations, the processor 151 can provide the same excitation signal as input to the transducer 110 to generate synchronized copies of the same TX signal. In some implementations, the processor 151 can provide delayed versions (such as with distinct time delays) of an excitation signal as input to the transducer 110 to generate delayed versions of the same TX signal.

Figure 3:
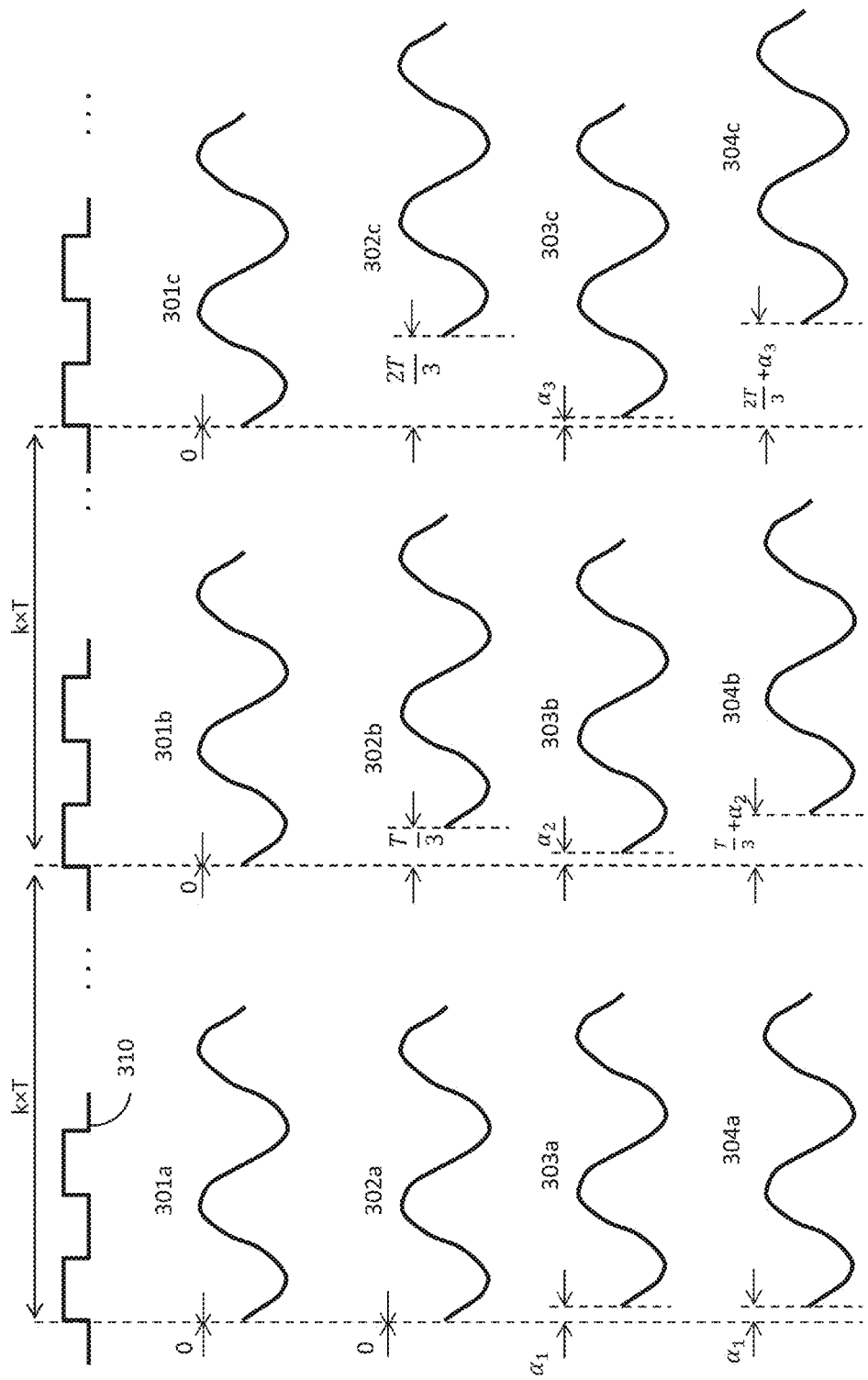
FIG. 3 is a diagram illustrating different implementations of copies or versions of a transmit (TX) signal for transmission within a given time period.

FIG. 3 is a diagram illustrating different implementations of copies or versions of a transmit (TX) signal for transmission within a given time period. According to a first scenario, the transducer 110 can transmit consecutively three (or any other number of) copies 301a, 301b and 301c of the TX signal having the same fractional (or differential) time delay (e.g., zero fractional time delay) with respect to the rising edges of the ADC clock signal 310. As such, the relative transmission time delay between any two of the three copies 301a, 301b and 301c of the TX signal can be a multiple of the period T (such as k×T where k is an integer) of the ADC clock signal 310.

According to a second scenario, the transducer 110 can transmit three (or any other number of) versions 302a, 302b and 302c of the TX signal having distinct deterministic fractional (or differential) time delays with respect to rising edges of the ADC clock signal 310. For instance, the fractional time delays can be 0, $$\frac{T}{3} \text{ and } \frac{2T}{3}$$

resulting in linear fractional (or differential) time delays. If N (N is an integer) versions of the TX signal are transmitted over the given period of time, the corresponding fractional time delays with respect to the rising edges of the ADC clock signal 310 can be equal to 0, $$\frac{T}{N}, \frac{2T}{N}, \ldots, \frac{(N-1)T}{N}.$$

As will be discussed below, the processor 151 can employ knowledge of the deterministic fractional (or differential) time delays for the transmitted versions (e.g., versions 302a, 302b and 302c) of the TX signal and the corresponding received RX signals to generate the high resolution RX signal. The transmitted versions 302a, 302b and 302c of the TX signal can propagate through the fluid (between the transducers 110) over non-overlapping time intervals. For instance, the transmit times associated with the transmitted versions (e.g., versions 301a, 302b and 302c) of the TX signal can be equal to t, $$t + \frac{T}{N} + kT, t + \frac{2T}{N} + 2kT, \ldots, t + \frac{(N-1)T}{N} + (n-1)kT.$$

Even though the transmitted versions of the TX signal are non-overlapping in time, the fractional (or differential) time delays 0, $$\frac{T}{N}, \frac{2T}{N}, \ldots, \frac{(N-1)T}{N}$$

are uniformly spaced apart from each other within the ADC clock signal period T (or ADC sampling period). In some implementations, the fractional (or differential) time delays can be non-uniformly spaced within the period T.

According to a third scenario, the transducer(s) 110 can transmit three (or any other number of) versions 303a, 303b and 303c of the TX signal with distinct respective random time delays (e.g., jittering delays) $\alpha_1$, $\alpha_2$ and $\alpha_3$ with respect to rising edges of the ADC clock signal 310. The processor 151 can generate the values for $\alpha_1$, $\alpha_2$ and $\alpha_3$ as instances of a random variable (such as a uniform random variable, Gaussian random variable, Ki-squared random variable or other random variable). In general, the processor 151 can generate N jitter time delays $\alpha_1, \alpha_2, \ldots, \alpha_N$ as N instances of a random variable for N respective versions of the TX signal to be transmitted within the given time period. In some implementations, applying jitter delays to the transmission times of the versions of the TX signal helps mitigate errors, such errors due to finite precision computing, in respective measured (or estimated) propagation times.

Figure 4A:
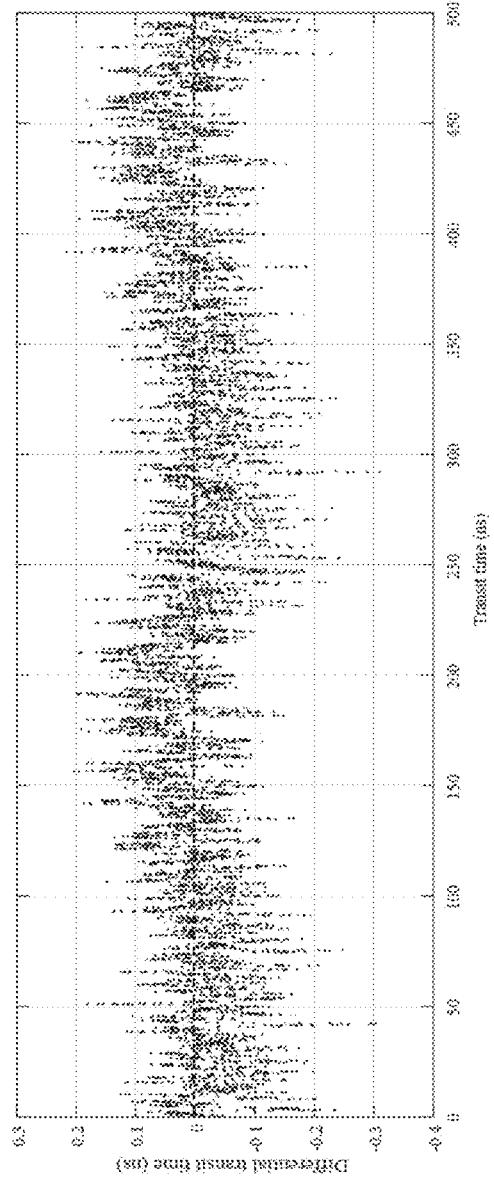
FIGS. 4A-4C show simulation results illustrating behavior of differential propagation times between downstream and upstream TX signals in a zero-flow fluid with and without jitter delays.
Figure 4B:
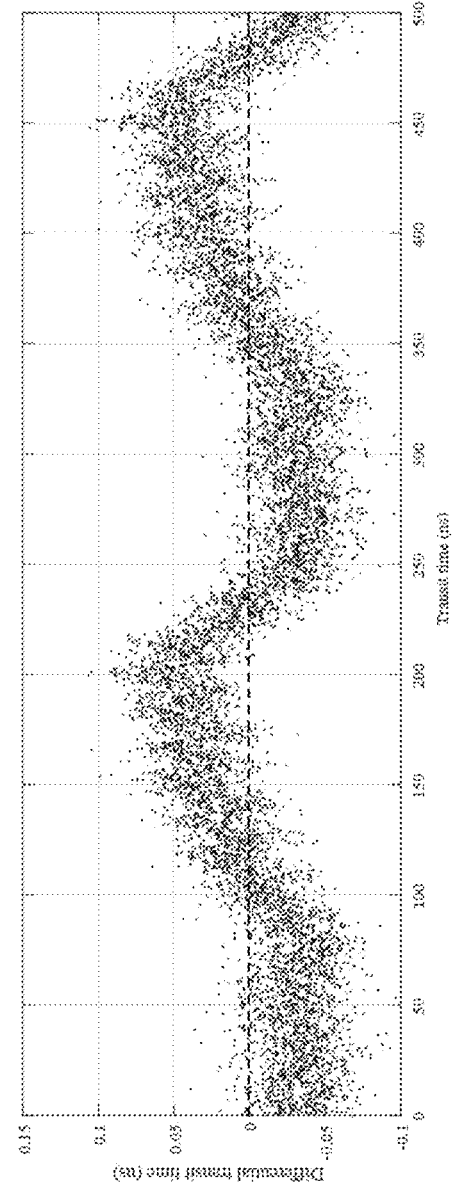
Figure 4C:
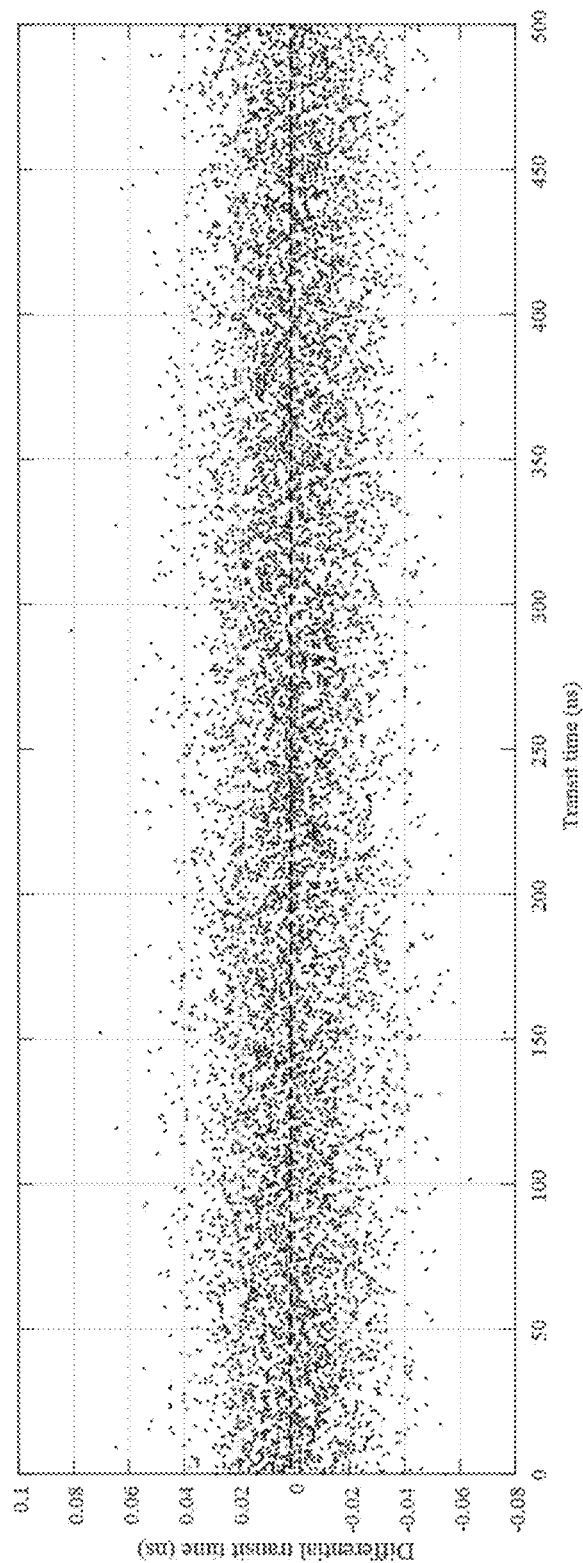

FIGS. 4A-4C show simulation results illustrating behavior of differential propagation times between downstream and upstream TX signals in a zero-flow fluid with and without jitter delays. The y-axis in FIGS. 4A-4C represents the differential propagation time between downstream and upstream signals and the x-axis represents the average propagation time for downstream and upstream signals. The differential propagation time is the measured time difference between downstream propagation time and upstream propagation time for a respective pair of transmitted signals including a downstream and upstream signals FIG. 4A shows simulation results for downstream and upstream signals with no jitter delays applied. FIG. 4B shows simulation results for downstream and upstream signals with jitter delays between 0 and 25 ns applied. FIG. 4C shows simulation results for downstream and upstream signals with jitter delays between 0 and 250 ns applied. For all simulation results in FIGS. 4A-4C, the downstream and upstream propagation times are associated with non-moving fluid (i.e., with flow rate equals 0 gallons per minute (GPM)). In zero-flow (i.e., still fluid) condition, one would expect recorded differential propagation times to be equal to zero. However, due to signal noise and computational errors, the recorded differential propagation times may not be exactly zero. By comparing the results in FIGS. 4A-4C, one can see that when no jitter delays are applied to the transmission times (as shown in FIG. 4A), the recorded differential propagation times exhibit relatively (e.g., compared to results in FIGS. 4B and 4C) larger deviations from zero. Also, as the average signal propagation time increases (i.e., increase along x-axis), the recorded differential propagation times exhibit a cumulative oscillation behavior around zero. However, when jitter delays are applied (as shown in FIGS. 4B and 4C), the recorded differential propagation times become closer to zero implying smaller respective errors. Also, while the results shown in FIG. 4B still show relatively larger errors and a cumulative oscillation behavior around zero as the average signal propagation time increases, the results shown in FIG. 4C illustrate an even smaller error with no oscillation behavior. As illustrated through the simulation results shown in FIGS. 4A-4C, the jitter delays applied to the transmission times of the transmitted versions of the TX signal mitigate the errors in the measured differential propagation times between downstream and upstream signals, and therefore allow for more accurate estimation of the propagation times and the differential propagation times of the transmitted versions of the TX signal.

According to a fourth scenario, the transducer(s) 110 can transmit three (or any other number of) versions 304*a*, 304*b* and 304*c* of the TX signal with respective time delays (with respect to rising edges of the ADC clock signal 310) defined as accumulations of deterministic and jitter delays. For instance, the fractional time delays associated with the versions 304*a*, 304*b* and 304*c* of the TX signal (with respect to rising edges of the ADC clock signal 310) can be equal to $\alpha_1$, $$\alpha_2 + \frac{T}{N} \text{ and } \alpha_3 + \frac{2T}{N},$$

respectively. For N transmitted versions of the TX signal, the respective time delays can be equal to $\alpha_1$, $$\alpha_2 + \frac{T}{N}, \alpha_3 + \frac{2T}{N}, \ldots, \alpha_N + \frac{(N-1)T}{N}.$$

As such, each time delay associated with a respective transmitted version of the TX signal is an aggregation of a deterministic time delay value (e.g., $$\frac{nT}{N},$$

where n is an integer between 0 and N−1) and a jitter time delay value (e.g., $\alpha_i$ where i is an index between 1 and N).

In some implementations, the processor 151 can apply the above described time delays to versions of an excitation signal provided as input to the transducer(s) 110, and in response, the transducer(s) 110 can generate corresponding TX signals with the same time delays applied to the corresponding excitation signal versions. While the scenarios shown in FIG. 3 are described with respect to time delays, the same scenarios can be implemented by applying phase shifts in the frequency domain. That is, instead of applying time delays to the excitation signals, the processor 151 can add phase shifts to the versions of the excitation signal in the frequency domain. The phase shifts can be deterministic phase shifts (i.e., corresponding to the second scenario), jitter phase shifts (corresponding to the third scenario) or a combination thereof (corresponding to the fourth scenario). The processor 151 can use fast Fourier transform (FFT) to transform the excitation signal to the frequency domain and inverse fast Fourier transform (IFFT) to transform phase-shifted versions of the excitation signal back to the time domain. In some implementations, the control circuit 150 can store a copy of the excitation signal and/or copies of the respective phase-shifted versions in the frequency domain in order to avoid repetitive FFT and/or IFFT computations. While the fractional time delays described above with respect to FIG. 3 are defined with respect to rising edges of the ADC clock signal 310, such fractional time delays can be defined with respect down edges or other references associated with the ADC clock signal 310.

The method 200 can include the ADC 155 sampling each of the received RX signals at a first sampling rate $R_1$ (stage 230). The ADC 155 can be coupled to the ultrasonic transducers 110 and configured to receive the RX signals directly from the transducers 110. In some implementations, an amplifier can amplify the received RX signals before the sampling process. Upon sampling the received RX signals, the ADC 155 can provide the respective samples to the processor 151 or a memory accessible by the processor 151. In some implementations, the first sampling rate $R_1$ can be smaller than a desired fine signal resolution (or a desired second sampling rate $R_d$). For instance, the first sampling rate can be in the range of hundreds of Mega Hertz (MHz) whereas the desired fine signal resolution can be associated with a second sampling rate in the range of Giga Hertz (GHz).

Referring back to FIG. 2, the method 200 can include the processor 151 generating, based on the samples of received RX signals, at least one respective fine resolution RX signal associated with a second sampling rate $R_d$ higher than the first sampling rate $R_1$. Given the first and desired sampling rates $R_1$ and $R_d$, the processor 151 can be configured to determine resolution factor rf (such as $$\left(\text{such as } rf = \left\lfloor \frac{R_d}{R_1} \right\rfloor \text{ or } \left\lceil \frac{R_d}{R_1} \right\rceil\right).$$

The processor 151 can then generate the fine resolution RX signal(s) based on the resolution factor rf and samples of the received RX signal(s).

Figure 5:
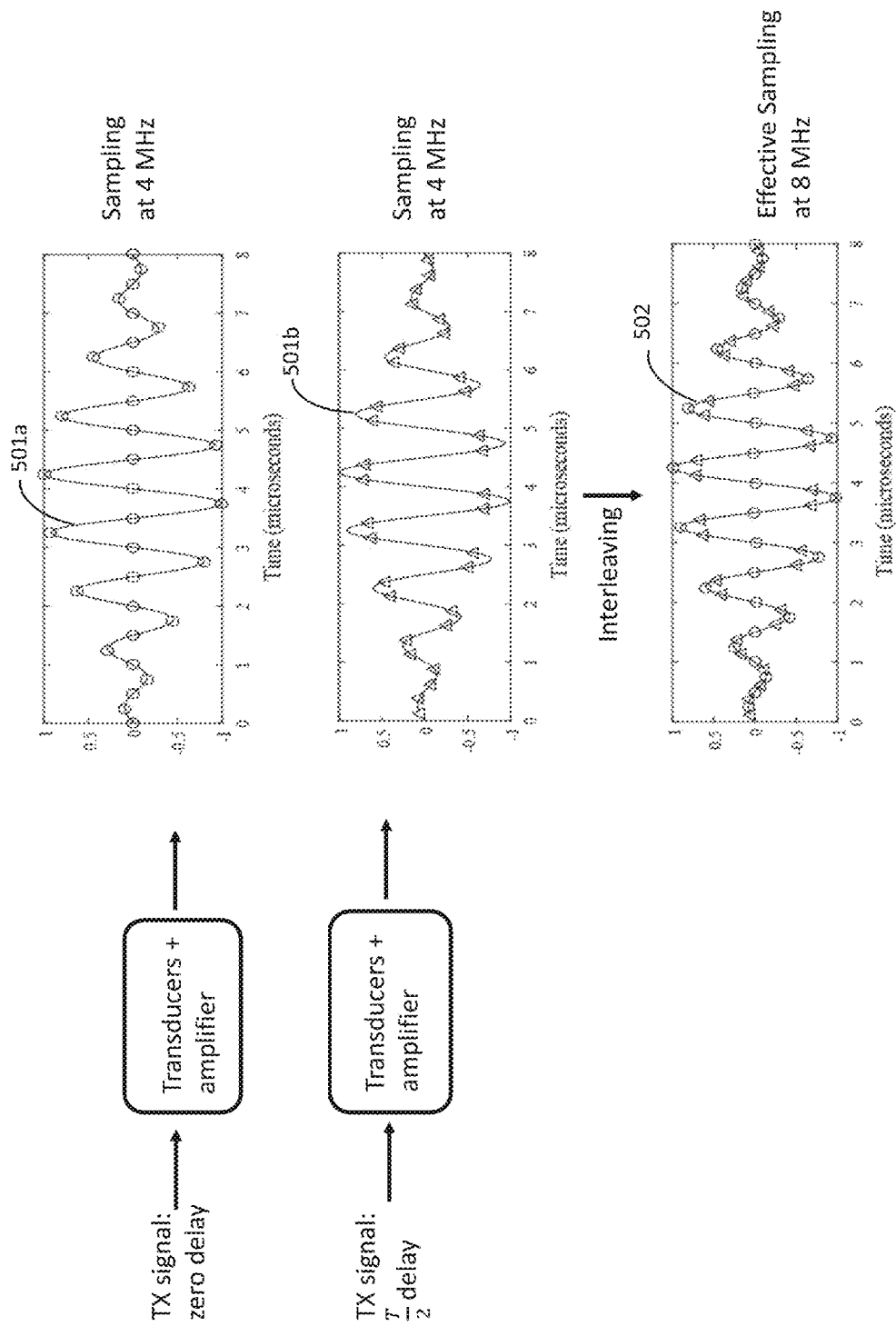
FIG. 5 is a diagram illustrating a process of interleaving samples from multiple received RX signals to generate a respective higher resolution interleaved signal.

FIG. 5 is a diagram illustrating a process of interleaving samples from multiple received RX signals to generate a respective higher resolution interleaved signal. The ultrasonic transducers 110 can transmit multiple copies of the TX signal with linear incremental fractional time delays with respect to the ADC clock signal (for instance, as discussed with respect to the second scenario of FIG. 3). In the example shown in FIG. 5, a first transducer 110 can transmit two versions of the TX signal with fractional time delays equal to 0 and $$\frac{T}{2},$$

respectively (or with corresponding phase shifts). A second transducer 110 can receive the respective RX signals and an amplifier associated with the control circuit 150 can amplify the received RX signals. The ADC 155 can then sample the amplified RX signals at a first sampling rate (e.g., equal to 4 MHz). The samples of the first RX signal 501a and the samples of the second RX signal 501b are out-of-sync by $$\frac{T}{2}.$$

The processor 151 can interleave the samples of the first and second RX signals 501a and 501b to generate a respective higher resolution interleaved resolution RX signal 502 with a respective effective sampling rate equal to (e.g., 8 MHz) twice the first sampling rate of the ADC 155. While the example illustrated in FIG. 5 shows interleaving of samples from two distinct RX signals (such as RX signals 501a and 501b), any number of RX signals can be employed to generate the interleaved signal 502.

In some implementations, the processor 151 can cause the first transducer 110 to transmit a number of versions of the TX signal equal to the resolution factor rf with respective incremental fractional time delays (or corresponding incremental phase shifts). The processor 151 can then interleave the samples of the respective rf received RX signals to generate a fine resolution RX signal with a second sampling rate $R_2 = rf \cdot R_1$. The incremental time delays can be incremental deterministic time delays (as discussed with respect to the second scenario of FIG. 3) or a combination of incremental deterministic time delays and jitter time delays (as discussed with respect to the fourth scenario of FIG. 3).

Figure 6:
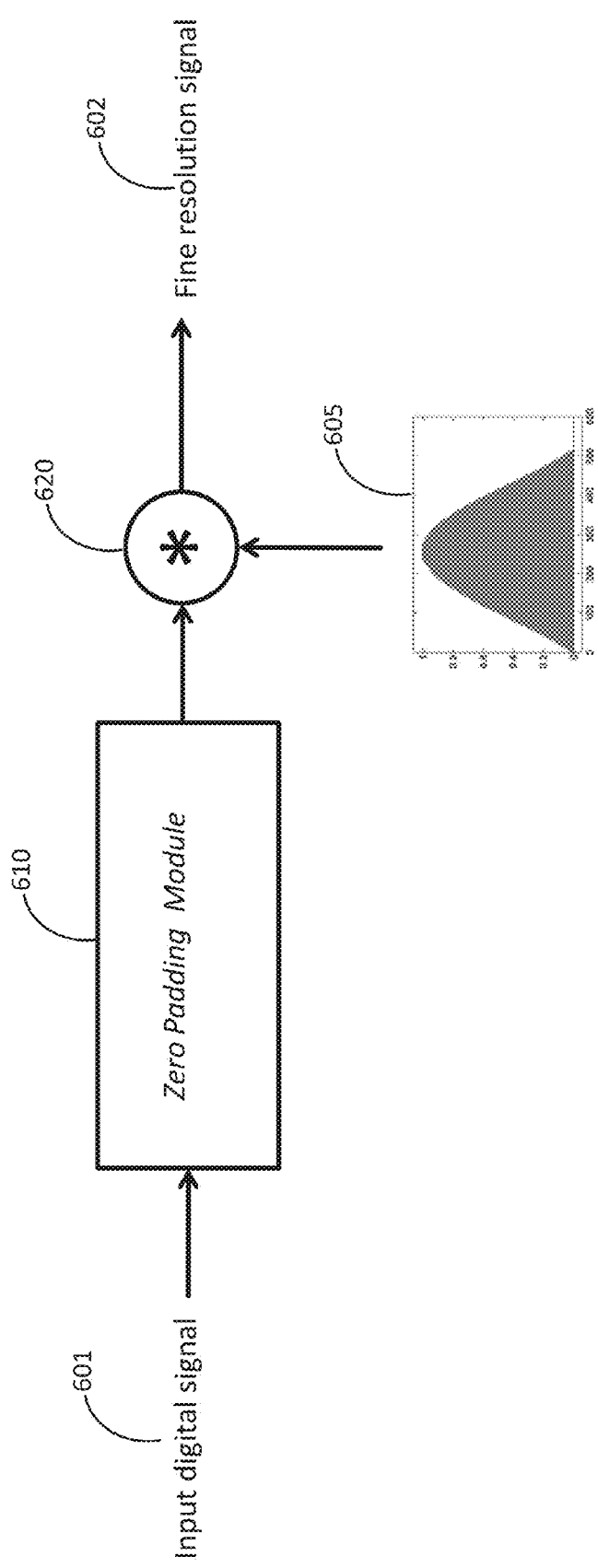
FIG. 6 is a diagram illustrating a process of up-sampling a digital signal associated with one or more ADC-sampled RX signals to generate a respective higher resolution up-sampled RX signal.

FIG. 6 is a diagram illustrating a process of up-sampling a digital signal associated with one or more ADC-sampled RX signals to generate a respective higher resolution up-sampled RX signal. In some implementations, the digital signal (to be up-sampled) can be a single ADC-sampled RX signal. In some implementations, the digital signal (to be up-sampled) can be an interleaved signal generated by interleaving samples from multiple received RX signals (for instance as discussed above with regard to FIG. 5). The processor 151 can be configured to insert zeros into an input digital signal 601 (block 610). For instance, if the input digital signal 601 is a sampled RX signal, for each sample of the sampled RX signal, the processor can be configured to insert rf−1 zeros (such as preceding or following the original sample). The processor 151 can then interpolate the samples of the zero-padded signal using a low pass filter or a transfer function thereof (block 620) to generate the fine resolution signal 602. In some implementations, the transfer function of the low-pass filter 605 can be a truncated sinc function. For instance, the transfer function 605 can be a truncated sinc function including a single lobe (i.e., the main lobe of the sinc function), truncated sinc function including three lobes or other truncation of the sinc function. In some implementations, the zero-padding at block 610 and the interpolation at block 620 can be implemented as a single filtering operation. In some implementations, other functions (such as a triangular function, or a truncated Gaussian function) can be employed for interpolation.

Figure 7:
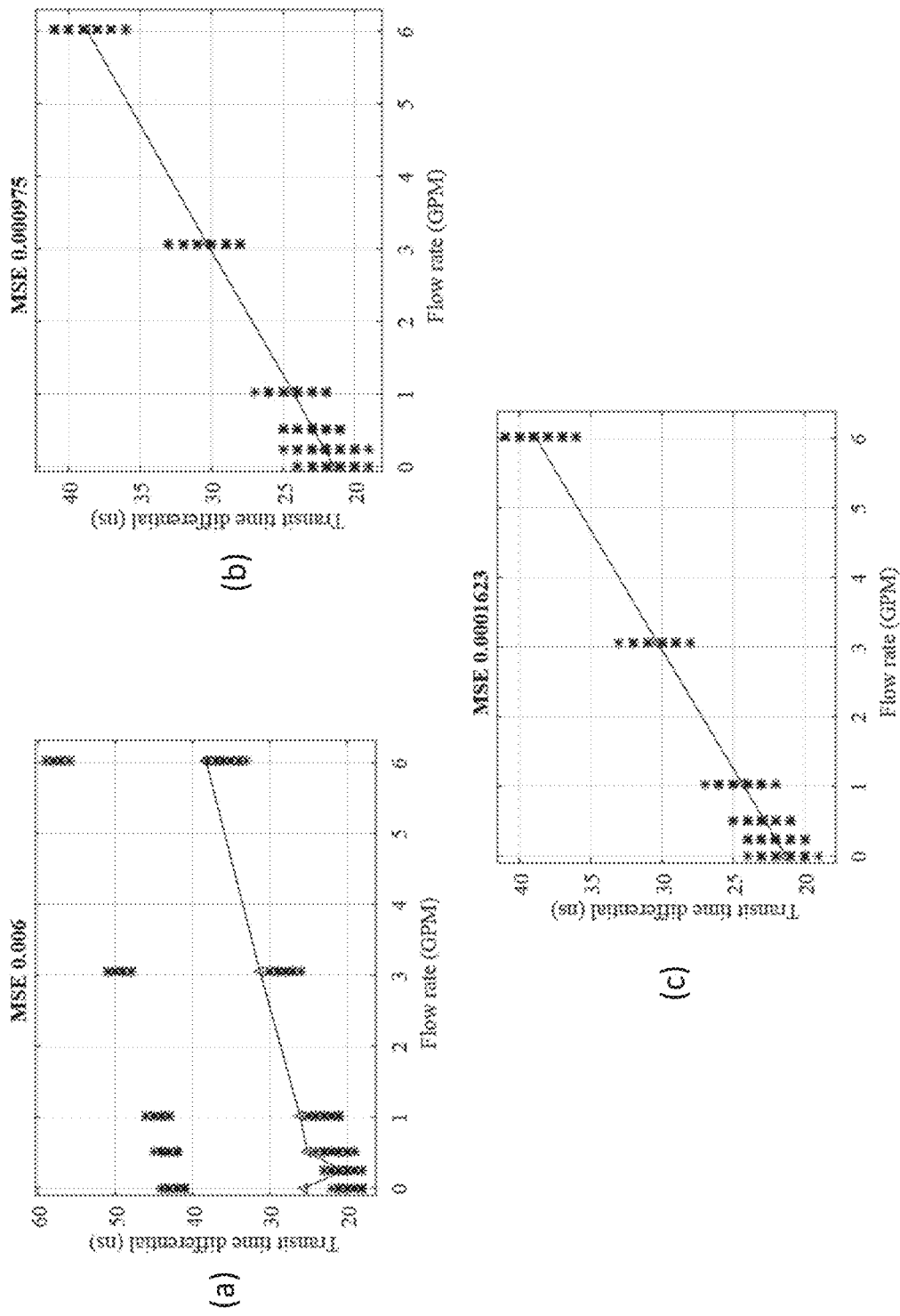
FIG. 7 shows experimental results for measured differential propagation times using up-sampled RX signals.

FIG. 7 shows experimental results for measured differential propagation times using up-sampled RX signals. The experimental results are generated based on a ¾ inch CPVC (Chlorinated Polyvinyl Chloride) pipe, 1 MHz ultrasonic transducers and 4 MHz ADC. The experimental results shown in plots (a)-(c) include 200 differential propagation times (between downstream and upstream signals) measured for each flow rate. The continuous lines represent the average differential propagation time (computed by averaging the measured differential propagation time values at respective fluid flow rates) as a function of the fluid flow rate. The differential propagation time values are measured by cross-correlating the up-sampled RX signals with a reference waveform having a respective sampling rate of 4 MHz.

With respect to the experimental results shown in plot (a), the received RX signals are zero-padded to achieve an up-sampling rate of 256 but no interpolation is applied when generating the respective up-sampled (or fine resolution) RX signals. The corresponding mean-square error (MSE) for the average differential propagation times shown in the plot (a) is 0.006. With respect to the experimental results shown in plot (b), the RX signals are zero-padded and an interpolation based on a zero-order-hold filter is then applied to the zero-padded signal to achieve an up-sampling rate of 256. The corresponding MSE is 0.0009975. With respect to the experimental results shown in plot set (c), the received RX signals are zero-padded and an interpolation based on a truncated sinc function with a single lobe is then applied to the zero-padded signal to achieve an up-sampling rate of 256. The corresponding MSE is 0.0001623. The computed MSEs illustrate that more accurate estimations of the differential propagation times can be achieved when using the truncated sinc function (with 512 samples) for interpolation compared to the case where no interpolation is applied (plot (a)) or an interpolation using a zero-order-hold filter is applied (plot (b)). That is, employing the truncated sinc function (e.g., truncated to include a single lobe) for interpolation allows for substantial improvement in terms of the accuracy of the estimated (or measured) signal propagation times. Also, truncating the sinc function (or any other transfer function of a respective low-pass filter) allows of reduction in computational complexity.

Referring back to FIGS. 2, 5 and 6, in some implementations, the processor 151 can generate the fine resolution signal by employing both signal interleaving (as discussed with regard to FIG. 5) and up-sampling (as discussed with regard to FIG. 6). Signal interleaving allows for accurately increasing signal resolution using RX signals received over a timer period during which channel characteristics do not vary (or at least do not vary significantly). However, in some instances, such time period may not be sufficient to transmit rf non-time-overlapping TX signals (and in response receive rf corresponding RX signals). For instance, if the time period during which channel characteristics are substantially non-varying is 5 ms and the time duration for transmitting each signal is 0.1 ms, the flow meter system can use at most 50 RX signals for interleaving to achieve an interleaved signal with effective sampling rate equal to 50 times the sampling rate of the RX signals. If the resolution factor rf is larger than 50 (such as rf=256), the flow meter system 100 can further apply up-sampling (as discusses with regard to FIG. 6) to an interleaved signal generate a fine resolution RX signal with the desired resolution $R_d$. Also, in some instances, the ADC sampling rate may be smaller than the Nyquist rate. In such instances, signal interleaving can be employed to avoid aliasing. The interleaved signal(s) can then be up-sampled to generate the fine resolution signal with desired resolution $R_d$.

Referring back to FIG. 2, the method 200 can include computing a cross correlation signal between the fine resolution RX signal and a reference waveform (stage 250) and determining a differential propagation time (or time delay) between the reference waveform and the fine resolution RX signal. The reference waveform can be a representation (e.g., a sampled version) of an upstream RX signal, downstream RX signal, zero-flow RX signal (i.e., a RX signal received when the fluid flow rate is zero), TX signal or a waveform derived therefrom. For instance, if the fine resolution RX signal is generated based on one or more downstream RX signals, the reference waveform can be an upstream RX signal or a zero-flow RX signal. If the fine resolution RX signal 502 or 602 is generated based on one or more upstream RX signals, the reference waveform can be associated with a downstream RX signal, a zero-flow RX signal or the TX signal. In some instances, the processor 151 can produce the reference waveform by filtering the TX signal (or the respective excitation signal) using a filter configured to model signal distortions induced by the transducers 110, the pipe 10, the fluid, the amplifier (if any), the ADC 155 or a combination thereof. In some implementations, the reference waveform can be a signal approximating the RX or TX signals. For instance, if the TX signal (or RX signal) is a narrow frequency band signal, the reference waveform can be a sine wave with a respective frequency being within that narrow frequency band. In some implementations, the reference waveform can be a signal component associated with the TX signal. For instance, if the TX signal is an aggregation of multiple harmonics (or multiple orthogonal signals), the reference waveform can include one of the multiple harmonics (or one of the orthogonal signals). In some implementations, the reference waveform can have a respective resolution corresponding to the first sampling rate, the second sampling rate or a sampling rate in between. Computing a full cross-correlation signal (i.e., including all cross correlation values based on the samples of the fine resolution signal and the reference waveform) is computationally demanding as it involves a huge number of multiplications.

Figure 8A:
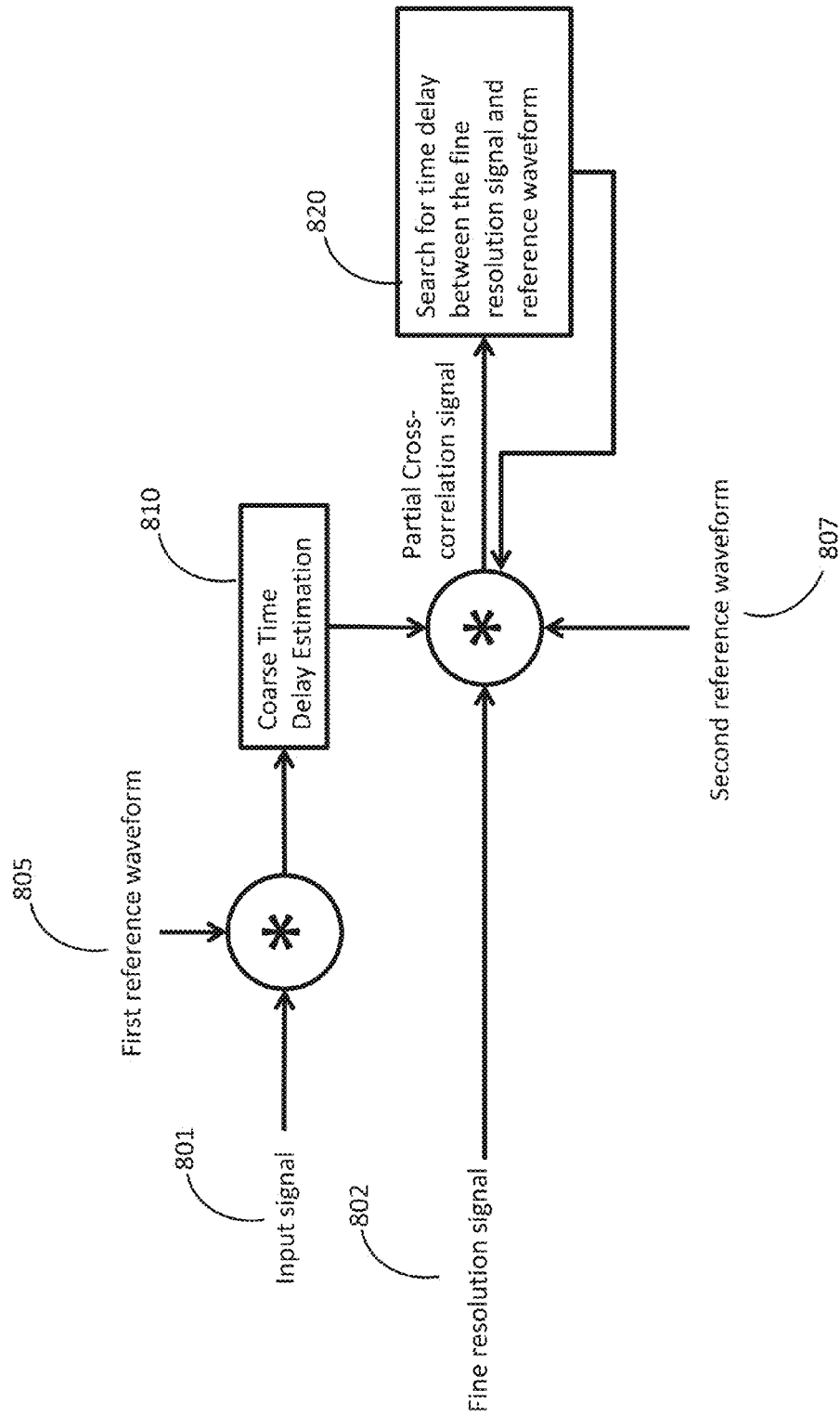
FIG. 8A shows a block diagram illustrating a process 800 of estimating a time delay between a reference waveform and a fine resolution RX signal based on partial cross-correlation signal(s).

FIG. 8A shows a block diagram illustrating a process 800 of estimating a time delay between a reference waveform and a fine resolution RX signal based on partial cross-correlation signal(s). The processor 151 can be configured to compute a first cross-correlation signal based on an input signal 801 generated based on one or more RX signals and a first reference signal 805. The input signal 801 can be a received RX signal (downstream or upstream), up-sampled version of a received RX signal, interleaved version of two or more received RX signals, fine resolution signal 802 or other signal representative of one or more RX signals. In some implementations, the effective sampling rate of the input signal 801 can be a rate ranging between $R_1$ to $R_d$. In some implementations, the second reference waveform can be 807 can be a sampled RX signal or a signal representative of one or more RX signals (such as an interleaved version of one or more RX signals) while the first reference waveform 805 can be a truncated, down-sampled or trimmed version of a the second reference waveform 807. In some implementations, the first reference waveform 805 can be produced by nullifying (i.e., forcing to be zero) the samples of the reference waveform 807 with respective amplitudes that are smaller than a given threshold value. For instance, the given threshold value can be equal to 90%, 95% or other percentage of the peak sample value of the second reference waveform 807. In some implementations, the first reference waveform 805 can be defined as a portion of the second reference waveform 807 associated with a respective time window. For instance, samples of the first reference waveform 805 can be equal to respective samples of the second reference waveform 807 within the given time window and equal to zero outside the given time window. The time window can be selected to capture the high energy samples (such as around the peak value) of the second reference waveform 807. In some implementations, the first and second reference waveforms 805 and 807 can be generated during calibration of the flow meter system 100. In some implementations, the first and second reference waveforms 805 and 807 can be generated on the fly based on one or more received RX signals. In some instances, if the fine resolution signal 802 is representative of one or more down-stream RX signals, the first and second waveforms 805 and 807 can be generated based on one or more up-stream RX signals (and vice versa). Using truncated, down-sampled or trimmed version of a received RX signal (or of a signal representative of one or more RX signals) allows for reduction in computational complexity when computing the first cross-correlation signal.

The processor 151 can then determine an estimate of the time delay between the input signal 801 and the first reference waveform 805 based on the computed first cross-correlation signal (block 810). The time delay estimate can be used as a coarse estimate to search for a more accurate time delay estimate between the fine resolution signal 802 and the second reference waveform 807. In some implementations, the processor 151 can simply locate a global or local maximum value, a global or local minimum value or a zero crossing of the first cross-correlation signal for use. In order to determine a more accurate estimate of the time delay between the fine resolution signal 802 and the second reference waveform 807, the processor 151 can compute a second cross-correlation signal (e.g., a partial cross-correlation signal) using the fine resolution RX signal 802 and the second reference waveform 807. In computing the second cross-correlation signal, the processor 151 can compute respective samples associated with a neighborhood of a reference point in the second cross-correlation signal. The reference point can be determined based on another reference point associated with the first cross-correlation signal. The processor 151 can be configured to compute a subset of the cross-correlation values associated with the second cross-correlation signal.

Figure 8B:
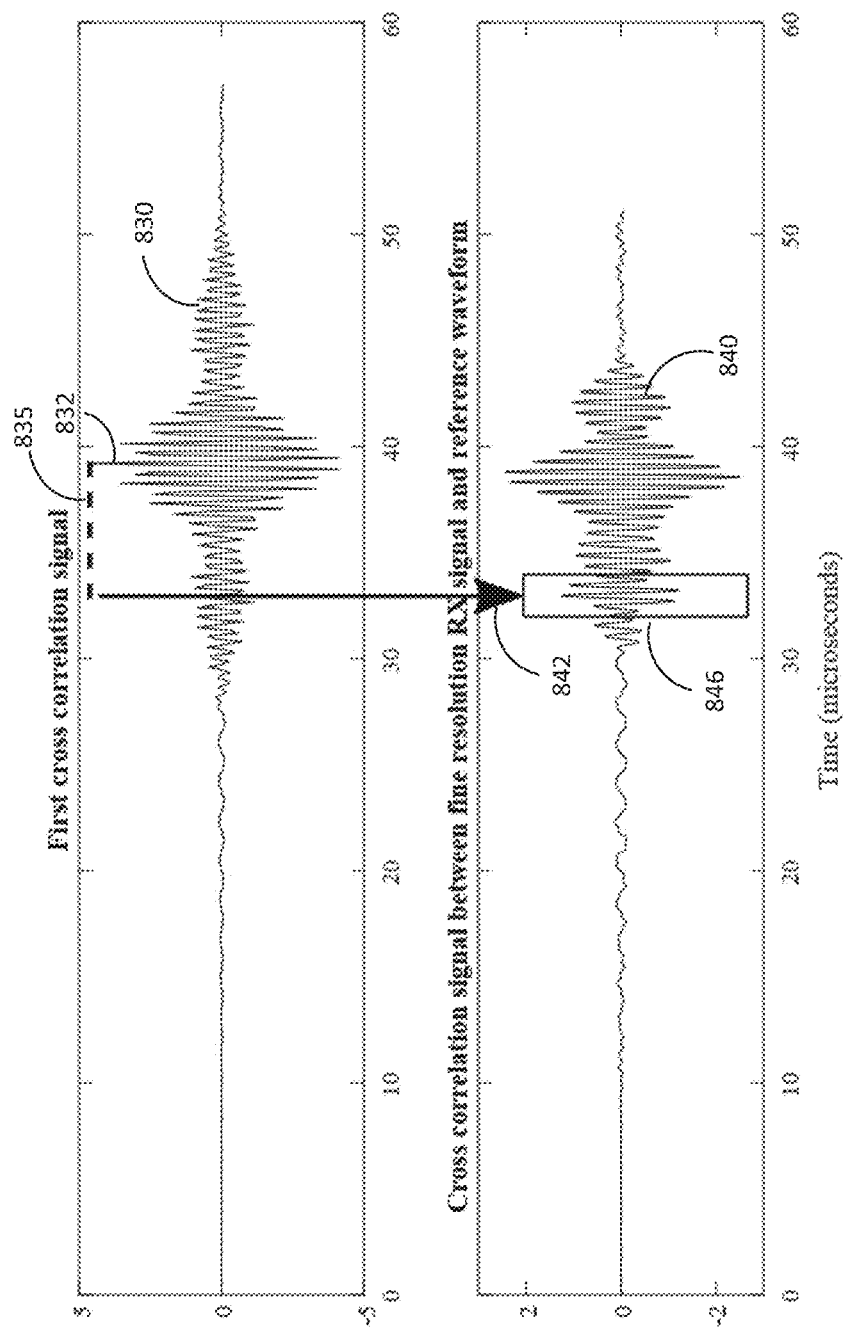
FIG. 8B shows an illustration of the first and second cross correlation signals.

FIG. 8B shows an illustration of the first and second cross correlation signals 830 and 840. The processor 151 can determine a first reference point 832 associated with (such as the peak of) the first cross-correlation signal 830 and use the first reference point 832 to determine a second reference point 842 (such as a local maximum) associated with the second cross-correlation signal 840. In some implementations, the processor 151 can employ an offset value 835 (e.g., determined during calibration of the flow meter system 100) to determine the second reference point 842 based on the first reference point 832. In some implementations, the processor 151 can then determine a time window 846 based on the second reference point 842 and can compute samples of the second cross-correlation signal 840 associated with the time window 846. The time window 846 can be centered at (or including) the second reference point 842. By using the time window 846, the processor 151 can compute a relatively small number of cross-correlation values when computing the second cross-correlation signal.

In order to determine an accurate estimate of the time delay between the fine resolution RX signal 802 and the second reference waveform 807, the processor 151 can then search for a local maximum (or other feature such as a local minimum or zero crossing) of the second cross-correlation signal 840 based the time window 846 (block 820 of FIG. 8A). In some implementations, the time window 846 can be defined to include a single local maximum regardless of its location within the second cross-correlation signal 840. The processor 151 can determine the time delay between the fine resolution RX signal 802 and the second reference waveform 807 based on the determined local maximum (or other feature) of the second cross-correlation signal 840. For instance, if the local maximum value is the cross-correlation sample generated as Σr(n). f(n+τ) where r(n) is the second reference waveform 807 and f(n) is the fine resolution RX signal 802, then τ is the time delay between the fine resolution RX signal 802 and the second reference waveform 807. In some implementations, the processor 151 can be configured to slide the time window 846 (and repeat searching for the local maximum) if the respective local maximum (or other reference feature) is determined to be on a boundary of the time window 846.

Figure 8C:
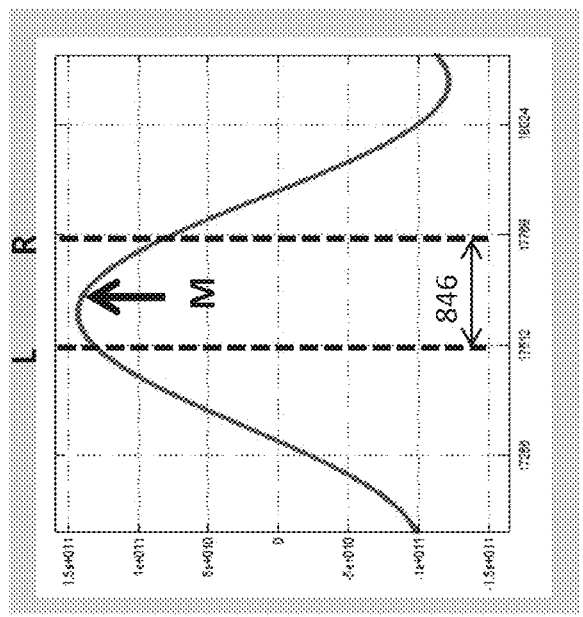
FIG. 8C shows a cross-correlation plot and a state machine diagram illustrating a process for determining a cross-correlation peak value associated with a respective time window.
Figure 8C:
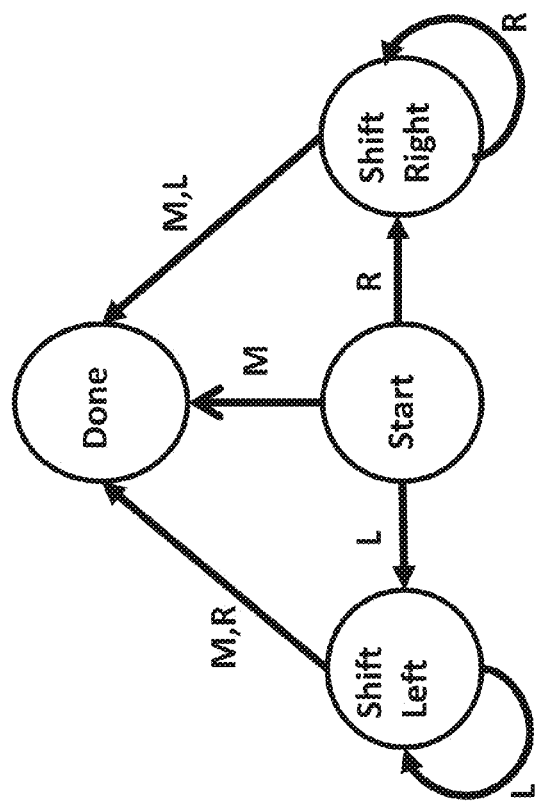

FIG. 8C shows a cross-correlation plot and a state machine diagram illustrating a process for determining a cross-correlation feature value (such as local maximum or local minimum) associated with a respective time window 846. Given the time window 846, the processor 151 can compute all cross-correlation values within the time window 846. As discussed above with respect to FIG. 8B, the processor 151 can define the time window 846 based on a first reference point 832 associated with the first cross-correlation signal 830. The processor 151 can locate a feature value (such as local maximum or local minimum) within the time window 846. If the value is not on the boundary of the time window 846 (not at L or R), the processor 151 can stop the search process and use the determined location of the feature value to determine the time delay between the fine resolution RX signal 802 and the second reference waveform 807. If the location of the feature value is determined to be at the right boundary (at point R) of the time window 846, the processor 151 can shift the time window 846 to the right and restart the search process for the feature value. If the location of the feature value is determined to be at the left boundary (at point L) of the time window 815, the processor 151 can shift the time window 846 to the left and restart the search process. Shifting the time window 846 can include computing additional cross-correlation values (e.g., not previously computed). As shown in the state machine diagram, the processor 151 can stop the search process if the cross-correlation peak is determined to be located (i) not on a boundary point of the time window 846, (ii) on the right boundary point of the time window 846 after a left-shift or (iii) on the left boundary point of the time window after a right-shift.

Figure 8D:
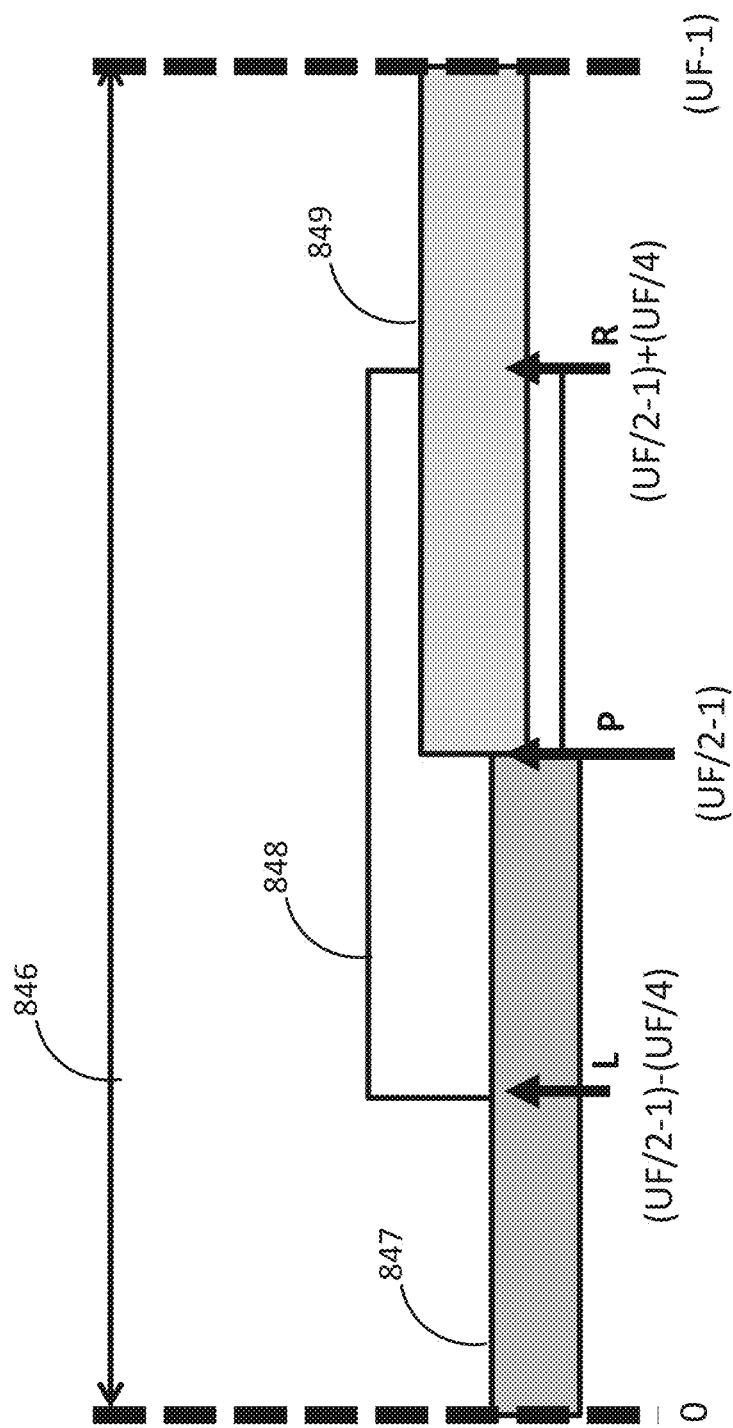
FIG. 8D is a diagram illustrating a ternary search for locating a feature value (such as local maximum or local minimum) within a time window.

FIG. 8D is a diagram illustrating a ternary search for locating a feature value (such as local maximum or local minimum) within a time window 846. The processor can be configured to segment the time window 846 into three overlapping time segments; a left segment 847, a center segment 848 and a right segment 848. In some implementations, the time window 846 can have a length equal to an up-sampling factor UF (or resolution factor if) associated with the fine resolution RX signal 802. The processor 151 can compute and compare cross-correlation values at a middle point P and boundaries points L and R of the center segment 848.

If the cross-correlation value associated with the left boundary point L is determined to be the largest (among three computed values), the processor 151 can sub-divide the time left segment 847 into three respective overlapping sub-segments (similar to segmentation of time window 846). The processor 151 can then compare the cross-correlation values associated with the middle and boundary points of the middle sub-segment within the left segment 847 (similar to points L, P and R of segment 848). If the cross-correlation value associated with the right boundary point R is determined to be the largest (among three computed values), the processor 151 can sub-divide the right segment 849 into three respective overlapping sub-segments (similar to segmentation of time window 846). The processor can then compare the cross-correlation values associated with the middle and boundary points of the middle sub-segment within the right segment 849 (similar to points L, P and R of segment 848). If the cross-correlation value associated with the middle point P is determined to be the largest (among three computed values), the processor 151 can then segment the center segment 848 into three overlapping sub-segments and apply the same search process to the three sub-segment. That is, the processor 151 can compute cross correlation values associated with the middle and boundary points of the center sub-segment and compare such values to determine which segment is to be further sub-divided in smaller segments.

The processor 151 can repeat the process described above until the center sub-segment cannot be segmented any further, in which case the location of the largest cross-correlation value determined through the search process is checked. If the largest cross-correlation value (found by the ternary search process) is found to be smaller any of the cross-correlation values at the boundary points (such as at 0 or UF-1) of the original time window 846, the processor 151 can shift the time window 846 towards the boundary point (such as to the left or to the right) with the largest cross-correlation value and repeat the ternary search process for the shifted time window. If the largest cross-correlation value (determined by the ternary search process) is found to be greater than both cross-correlation values at the boundary points (such as at 0 or UF-1) of the original time window 846, the processor 151 can use the largest cross-correlation value determined by the ternary search process as the local maximum. In some implementations, the processor 151 can be configured to store cross-correlation values computed at each stage of the ternary search process to avoid repetitive computing of a given cross-correlation value.

The processes discussed with regard to FIGS. 8A-8D allow for computationally efficient estimation of the time delay between the fine resolution RX signal 802 and the second reference waveform 807. In particular, the discussed processes allow for significant reduction in the number of cross-correlation values computed even when fine resolution RX signals are employed. Also, the processor 151 can be configured to compute the first cross-correlation signal 830 only once. Once the respective first reference point 832 is determined, the processor 151 can use it for all subsequent fine resolution signals 802 to determine the time window 846. For instance, if the first reference point 832 is determined using an input signal 801 corresponding to a respective downstream RX signal, the processor 151 can use the same reference point (without re-computing the first cross-correlation signal 830) for subsequent downstream or up-stream RX signals to determine the respective time window 846.

In some implementations, the processor 151 can be configured to compute several estimates of the time delays between a plurality of received RX signals (e.g., including downstream and/or up-stream RX signals) and respective reference waveform(s) 807. When jitter delays are employed (as discussed with regard to FIG. 3), the processor 151 can be configured to take the added delay into consideration when determining the second reference point 842 based on the first reference point 832. The processor 151 can also be configured to average signal propagation times estimated based on two or more RX signals (e.g., associated with distinct jitter delays) to produce a final estimate of the signal propagation time.

Referring back to FIG. 2, the processor 151 can determine the fluid flow rate (or fluid flow speed) based on the determined time delay between the fine resolution RX signal 802 and the reference waveform (stage 260). The processor 151 can employ a lookup table or a formula to compute the fluid flow rate (or fluid flow speed). For instance, water flow rate is proportional to differential propagation time between downstream and upstream signals. The processor 151 can have access to a data structure (e.g., a lookup table) mapping time delays between RX signals and the reference waveform to corresponding fluid flow rates (or fluid flow speeds). In some implementations, the mapping can be dependent on the temperature of the fluid or the lumen. For instance, the fluid flow meter system 100 can include (or be couple to) a thermostat for measuring the temperature of the environment, the lumen or the fluid therein. In some implementations, the processor 151 can compute the fluid flow rate (or fluid flow velocity) based on a mathematical formula correlating differential propagation times to corresponding fluid flow rates (or fluid flow velocities).

Figure 9:
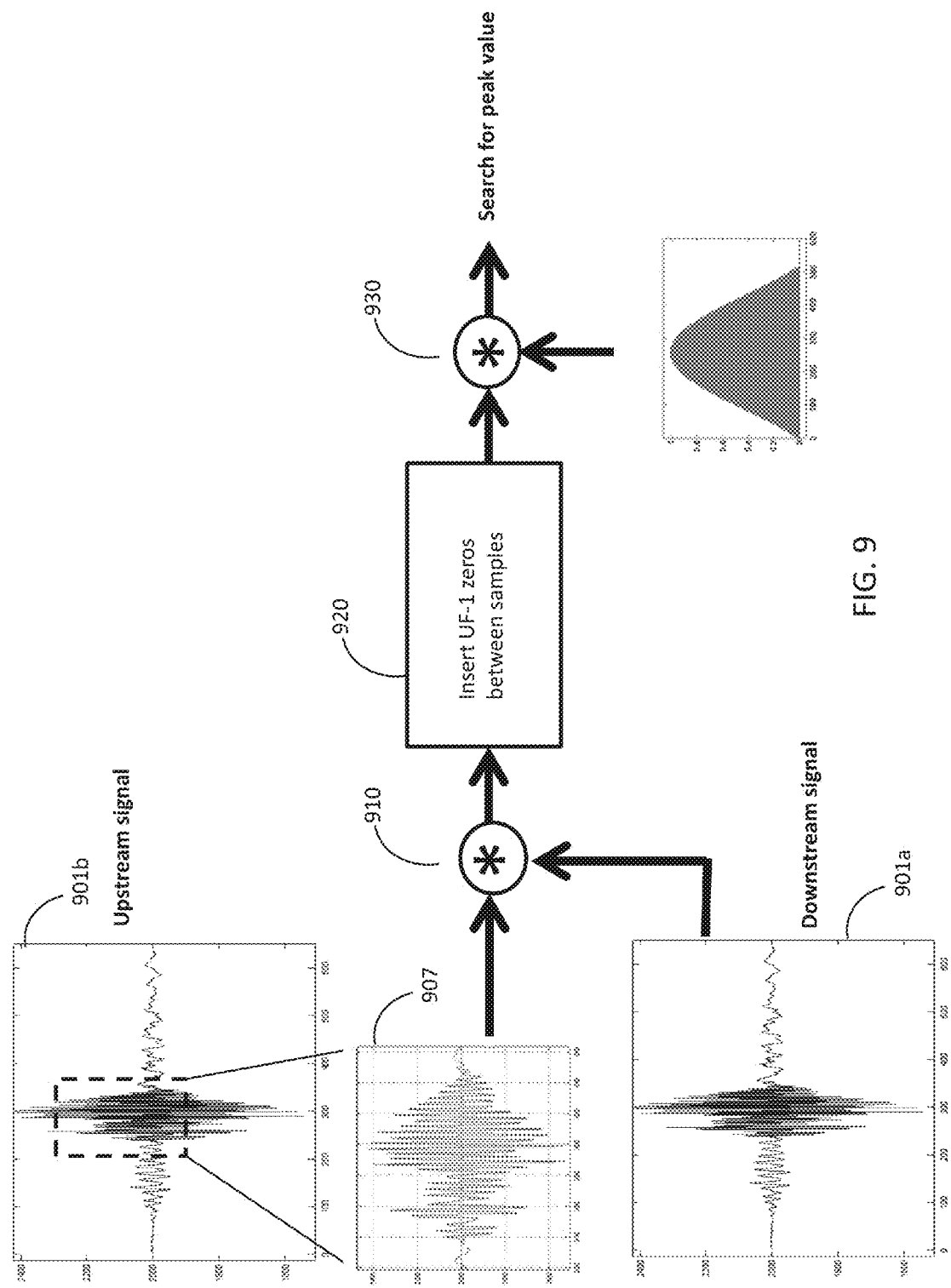
FIG. 9 shows a block diagram illustrating another method for estimating fluid flow rate (or fluid flow velocity) based on recorded ultrasonic signals.

FIG. 9 shows a block diagram illustrating another method for estimating fluid flow rate (or fluid flow velocity) based on recorded ultrasonic signals. The processor 151 can cross-correlate (block 910) a first RX signal (e.g., a downstream RX signal) 901a with a reference waveform 907 that is generated based on a second RX signal (e.g., an upstream RX signal) 901b. In some implementations, the first and second RX signals 901a and 901b are sampled at the first sampling rate (e.g., the sampling rate of the ADC 155). In some implementations, the processor 151 can produce the reference waveform 907 by applying a window operation to the second RX signal 910b. That is, the reference waveform 907 represents a portion of the second RX signal 901b that is associated with a time window 950. The processor 151 can then up-sample the cross-correlation computed based on the first RX signal 901a and the reference waveform 907 by applying zero-padding (bock 920) followed by interpolation, for instance, using a truncated sinc function (block 93). The processor 151 can then locate the maximum of the cross-correlation signal to determine the relative time delay (or differential signal propagation time) between the first and second RX signals 901a and 901b. In some implementations, the processor 151 can apply a window search process (e.g., as discussed with regard to FIG. 8C) to locate the cross-correlation peak. In some implementations, the first RX signal 901 can be an upstream RX signal and the second RX signal can be a downstream signal. In some implementations, the first RX signal 901a can be a downstream or upstream signal while the second RX signal can be zero flow RX signal.

Compared to the method described in FIG. 2, the method described in FIG. 9 does involve generating a fine resolution RX signal. The cross-correlation can be computed between signals sampled at the sampling rate of the ADC 155. However, the computed cross-correlation signal can be up-sampled to achieve better estimate of the relative time delay between the first and second RX signals 901 and 901b.

While the systems, devices and methods in the current disclosure are described in terms of ultrasonic transducers, alternative flow rate sensors can include magnetic field sensors acoustic sensors or other sensors capable of sensing other types of signals propagating through a fluid in a lumen. The systems, devices and methods described in the current disclosure can be used to measure flow rates in fluid distribution systems such as water distribution systems, natural gas distribution systems, oil distribution systems, or other fluid distribution systems used in different industries.

While the invention has been particularly shown and described with reference to specific embodiments, it should be understood by those skilled in the art that various changes in form and detail may be made therein without departing from the spirit and scope of the invention as defined by the following claims.

What is claimed is:

1. A method of measuring fluid flow parameters of fluids flowing through lumens, the method comprising:
    transmitting through a fluid flowing through a lumen, by a first transducer of a sensor secured to a structure defining the lumen, a plurality of transmit (TX) signals, each of the plurality of TX signals transmitted with a respective time delay from a clock signal of an analog-to-digital converter;
    receiving, by a second transducer of the sensor, a plurality of receive (RX) signals, each one corresponding to a respective one of the plurality of transmitted TX signals;
    sampling, by the analog-to-digital converter, at a first sampling rate, the plurality of RX signals received by the second transducer;
    generating, by a processor, a fine resolution signal using sampled versions of the plurality of RX signals generated by the analog-to-digital converter, the fine resolution signal associated with a second sampling rate higher than the first sampling rate;
    computing, by the processor, a cross-correlation signal indicative of cross-correlation between the fine resolution signal and a reference waveform; and
    determining, by the processor, an estimate of a fluid flow parameter of the fluid based on the computed cross-correlation signal.

2. The method of claim 1, wherein the fluid flow parameter includes fluid flow rate or fluid flow velocity.

3. The method of claim 1, wherein the plurality of TX signals are transmitted with distinct jitter delays with respect to periods of the clock signal of the analog-to-digital converter.

4. The method of claim 3, wherein determining an estimate of the fluid flow parameter includes:
    determining, by the processor, multiple first estimates of the fluid flow parameter based on the plurality of RX signals corresponding to the TX signals transmitted with distinct jitter delays with respect to the periods of the clock signal of the analog-to-digital converter; and
    generating, by the processor, a final estimate of the fluid flow parameter by averaging the multiple first estimates.

5. The method of claim 1, wherein generating a fine resolution signal includes up-sampling a signal associated with the sampled versions of the plurality of RX signals, the up-sampling includes applying interpolation using a truncated sinc function.

6. The method of claim 1, wherein the plurality of TX signals are transmitted with distinct incremental delays with respect to periods of the clock signal of the analog-to-digital converter.

7. The method of claim 6, wherein generating the fine resolution signal includes interleaving samples of the plurality of RX signals corresponding to the plurality of TX signals transmitted with distinct incremental delays with respect to the periods of the clock signal of the analog-to-digital converter.

8. The method of claim 7, wherein generating the fine resolution signal further includes up-sampling an interleaved signal generated by interleaving the samples of the plurality of RX signals corresponding to the plurality of TX signals transmitted with distinct incremental delays with respect to the periods of the clock signal of the analog-to-digital converter.

9. The method of claim 1, wherein the reference waveform is associated with a RX signal received by the first transducer responsive to transmitting a TX signal by the second transducer.

10. The method of claim 1, wherein the reference waveform represents a signal component associated with the plurality of TX signals.

11. The method of claim 1, wherein the reference waveform is associated with a zero-flow RX signal.

12. The method of claim 1, wherein computing the cross-correlation signal includes:
computing a first cross-correlation signal between a first reference waveform and a signal associated with the sampled versions of the plurality of RX signals, the first reference waveform different from the reference waveform and the first cross-correlation signal different from the cross-correlation signal;
determining a time window based on the first cross-correlation signal; and
computing the cross-correlation signal by computing a plurality of cross-correlation values within the time window indicative of cross-correlations between the reference waveform and the fine resolution signal.

13. The method of claim 12, wherein determining the time window includes:
determining a first reference point associated with the first cross-correlation signal; and
determining a second reference point associated with the cross-correlation signal based on the first reference point; and
determining the time window based on the second reference point.

14. The method of claim 12, wherein samples of the first reference waveform that are less than a threshold value are nullified.

15. The method of claim 12, wherein the signal associated with the sampled versions of the plurality of RX signals includes at least one of:
a sampled version of a RX signal of the plurality of RX signals;
an up-sampled version of a RX signal of the plurality of RX signals;
an interleaved version of the sampled versions of plurality of RX signals; and
the fine resolution signal.

16. The method of claim 12 further comprising:
locating, by the processor, a maximum cross-correlation value of the plurality of cross-correlation values within the time window;
in response to locating the maximum cross-correlation value at a boundary point of the time window, shifting the time window towards that boundary point; and
in response to locating the maximum cross-correlation value inside the time window, determining a second time delay between the reference waveform and the fine resolution signal using a location of the maximum cross-correlation inside the time window.

17. The method of claim 16, wherein locating a maximum cross-correlation value inside the time window includes applying a ternary search process.

18. The method of claim 16 comprising:
determining, by the processor, the estimated fluid flow parameter based on the time delay between the reference waveform and the fine resolution signal.

19. The method of claim 18 comprising:
determining, by the processor, the estimated fluid flow parameter based on the time delay between the reference waveform and the fine resolution signal using a lookup table.

20. The method of claim 1 comprising:
determining, by the processor, multiple estimates of the fluid flow parameter based on downstream and up-stream RX signals.

* * * * *